United States Patent Office 3,078,205
Patented Feb. 19, 1963

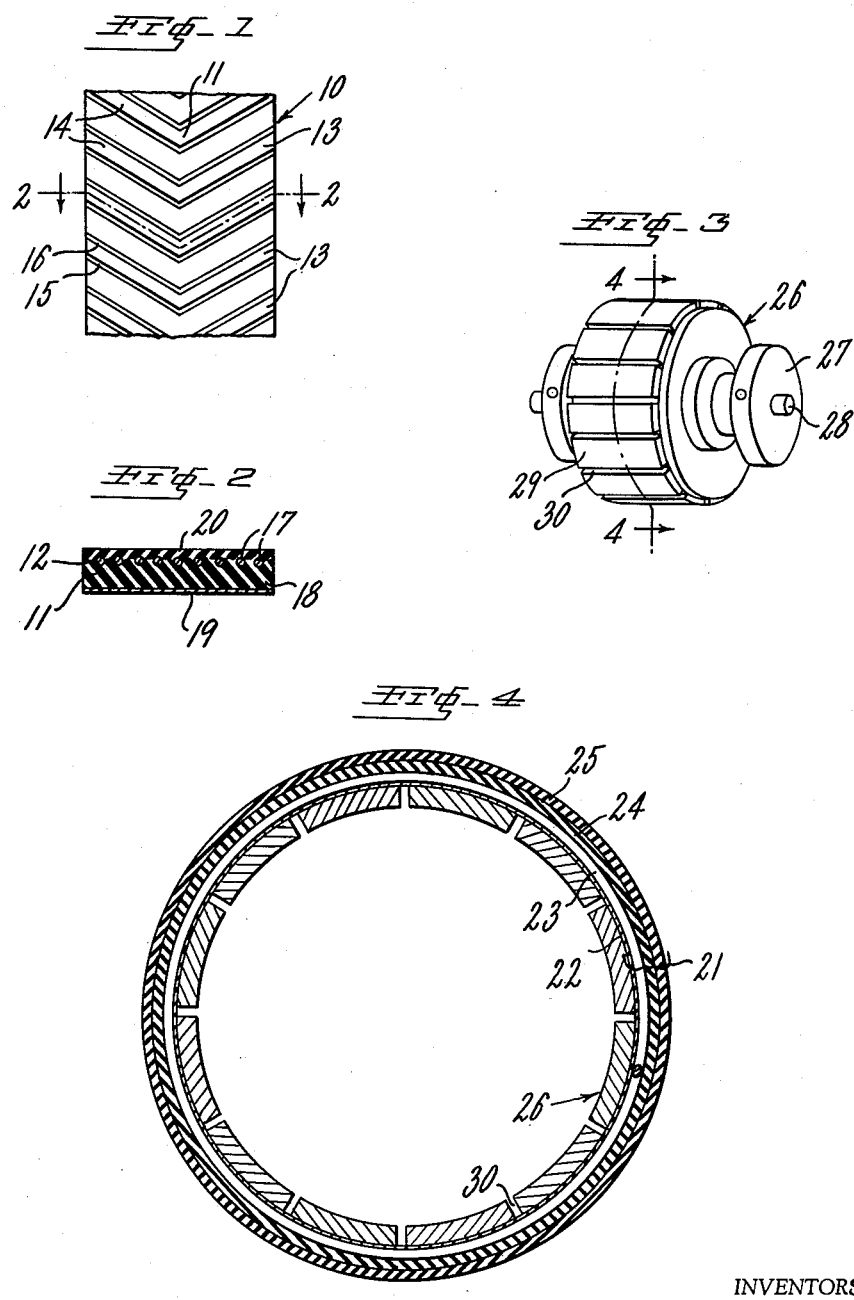

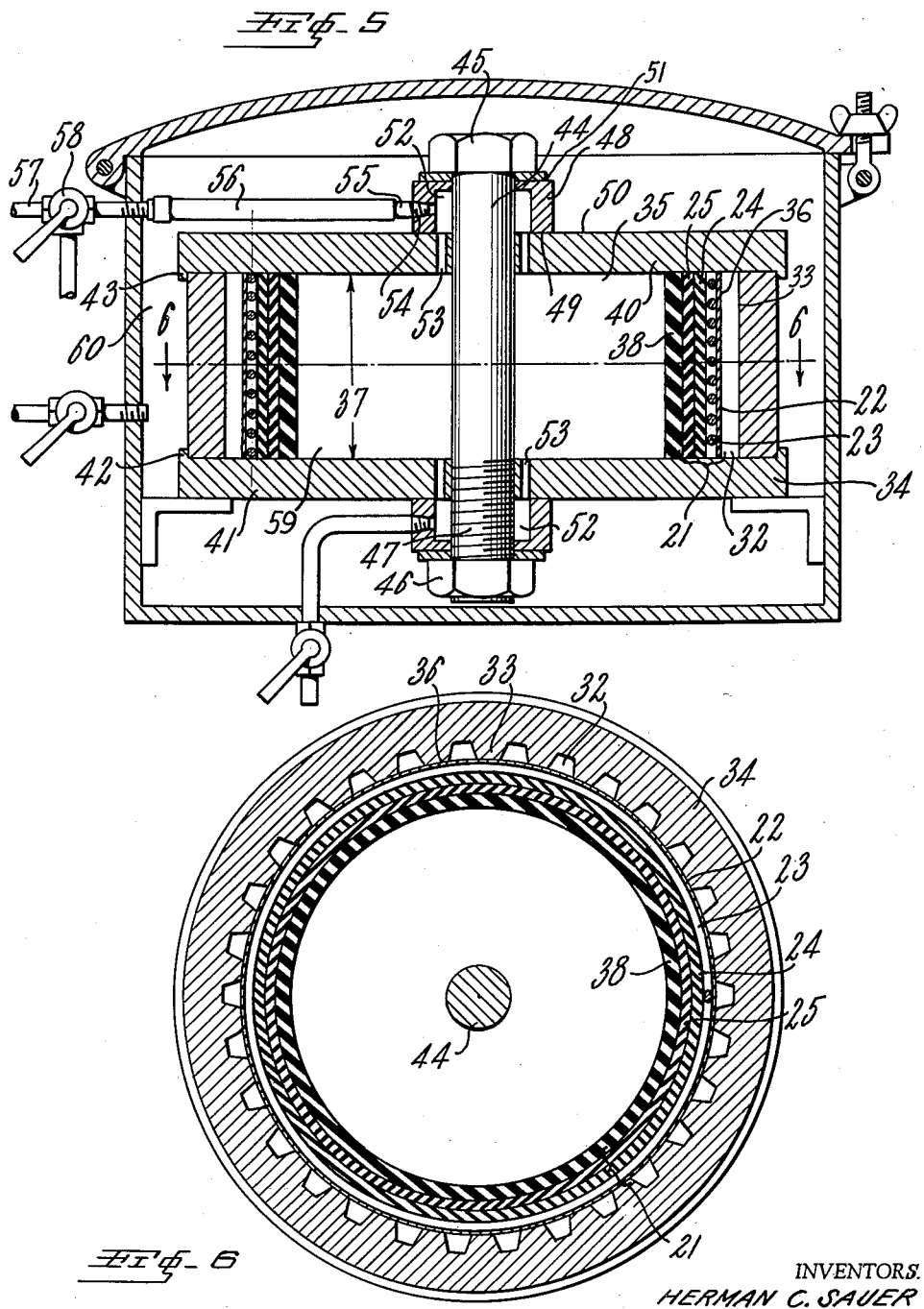

3,078,205
METHOD OF FORMING BELT TEETH IN REINFORCED POSITIVE DRIVE BELTS
Herman C. Sauer, Ambler, and James A. Flint III, Philadelphia, Pa., assignors to United States Rubber Company, New York, N.Y., a corporation of New Jersey
Filed Feb. 25, 1959, Ser. No. 795,548
7 Claims. (Cl. 156—137)

This invention relates to an improved method of molding positive drive belts of the type having a herringbone teeth pattern and of the type having straight planar teeth disclosed in United States Patent No. 2,507,852 to Richard Y. Case. Such positive drive belts are provided with strain resisting members or load carrying bands, to which are bonded plastic or resilient yieldable rubber like teeth adapted to mesh with the teeth of gear wheels, or grooves of pulleys, hereinafter referred to as gears. Belts of this type may be made with or without fabric tooth jackets.

This invention relates particularly to the operations involved in molding the belt teeth and also to the application of a protective jacket to herringbone teeth.

Heretofore the body of the belt teeth was separately formed and then placed in the tooth mold cavities in separate operations. However, in order to produce positive drive belts with uniform belt pitch lengths, each tooth was required to be identical with every other tooth, and each tooth further had to be of proper shape and volume to conform with the mold cavity in which the final belt is manufactured. However, volume variations in the tooth stock persisted in excess of small permissible tolerances thereby causing belt length variations.

A principal object of this invention is to simplify the method of making positive drive belts of the types specified and to improve the quality of the belts by forming belts of identical pitch lengths.

A further object of this invention is to provide a simple method of accurately forming a toothed belt having a load carrying band and without making each tooth separately.

A still further object of this invention is to form a belt in which the adhesion of the load carrying band to the adjacent belt elements is greatly increased.

Another object of this invention is to facilitate the accurate formation of the belt teeth by the utilization of a rubbery material which flows relatively freely through the load carrying band under a suitable molding pressure and sets to a suitable degree of hardness required for the proper performance of the belt teeth.

A still further object of this invention is to manufacture an accurately formed herringbone type positive drive belt.

The above objects of this invention are realized by arranging the endless load carrying band of the belt and a layer of tooth forming rubber around the interior or exterior peripheral surface of a mold having tooth cavities therein, the tooth cavities being empty, in such a manner that the band is interposed between the rubber and the mold cavities. The tooth forming rubber, a specially compounded rubber, becomes relatively fluid under heat and pressure and is forced through the band into the tooth cavities to fill the tooth cavities and mold the belt teeth and bond them to the band in a single operation.

In the event a tooth jacket is to be applied, a layer of stretchable fabric is interposed between the load carrying band and the surface of the mold containing the tooth cavities and the fabric is forced by and ahead of the rubber coming through the band, and the fabric is forced into the tooth cavities and caused to conform to their shape by the pressure of the rubber coming through the load carrying band.

Other objects and advantages of this invention will become apparent from the following description taken in connection with the accompanying drawings, wherein are set forth by way of illustration and example embodiments of this invention.

FIG. 1 is a top view of a herringbone type positive drive belt made in accordance with this invention;

FIG. 2 is a transverse cross-sectional view of the belt shown in FIG. 1 taken on line 2—2 of FIG. 1;

FIG. 3 is a perspective view of a collapsible drum or mandrel about which the belt layers are wound to build up a belt carcass;

FIG. 4 is a modified cross-sectional view of the peripheral elements of the collapsible drum shown in FIG. 3 and also showing a cross-sectional view of the belt carcass after it has been built thereon;

FIG. 5 is a vertical cross-sectional view of the belt mold with the belt-carcass therein and assembled in a vulcanizer in position for the final vulcanizing operation; and FIG. 6 is a cross-sectional view of the mold assembly shown in FIG. 5 and taken on line 5—5.

Referring now to the drawings, FIGS. 1 and 2 show a herringbone type positive drive belt 10 made in accordance with this invention and comprises resilient teeth 11 bonded to a load carrying band 12 of flexible substantially non-stretchable material having voids therein. Each tooth has sections 13 and 14 that are inclined in reverse directions forming a zig-zag or herringbone pattern; as shown, sections 13 and 14 form rows of parallel surfaces with their respective surfaces in each successive tooth. The front 15 and rear 16 surfaces of each tooth slopes rearwardly. As shown herein, the band 12 is made of a plurality of helical convolutions of a strand 17, which may be of single or stranded cord or wire, or any other material having substantially inelastic properties and porous surfaces, such as cloth, mesh or web; an endless woven fabric tubular or an endless woven wire mesh tubular could be used with the warp strands as the load carrying member and the fill as binder; that is the load carrying member must have voids so that the tooth stock rubber may pass therethrough. In the event the belt is to be used for very light loads, the band may be made of suitable loosely woven fabric having its ends suitably joined or spliced.

The body of the belt 18 is made of rubber and includes teeth 11 and the portion surrounding and adhering to each of the load carrying band elements or stands 17. The teeth 11 are covered with a fabric jacket 19, which is united to the rubber belt body 18. The belt 10 may be provided with a top cover of rubber 20 which is joined to the belt body 18; however, this top cover of rubber may also extend through the load carrying band 12 to be united with the teeth 11 and load carrying band 12, and also to the fabric jacket between the teeth.

The zig-zag sections 13 and 14 are desirable since they substantially prevent side travel of the belt as it moves over a driving gear. However, this very desirable feature is responsible for the difficulty in manufacturing herringbone positive drive belts since the belt can not be pulled upwards and slipped off its forming mold because of the manner in which the teeth of the belt and gear mesh. The method described hereinafter eliminates the difficulty.

The method of making the belt shown in FIGS. 1–2 may best be explained by referring to FIGS. 3–6 of the drawings. In FIG. 3, there is shown a conventional collapsible drum 26 used in assembling belt carcass 21. The term belt carcass, as used herein refers to the several superimposed layers that are ultimately placed in the mold and comprises the elements of the belt, shown at FIG. 4 as the fabric layer 22, the load carrying winding layer 23, the layer of tooth stock rubber 24 and the layer of top cover rubber 25. The collapsible drum 26 is of generally cylindrical shape and includes a rotatable member or end plate 27 suitably coupled to rotate a central shaft 28. The plates 29 are moved outwardly to expand the drum when the rotatable member 27 is turned, and are moved inwardly to collapse the drum when the rotatable member is turned in the reverse direction. The linkage between the shaft 28 and plates 29 is conventional, and may include for example, a plurality of truncated cones, not shown, connected to each plate, and adapted to move radially in or out in response to a turn of the rotatable member 27.

The belt carcass is built up as follows. The drum is expanded and a stretchable fabric 22 is wrapped therearound being in direct contact with the tops of plates 29 and covering the spaces 30 between the sides of the plates. The outer circumference of the expanded drum has a circumference equal to the upper mold surface perimeter 36 of the mold ring 34. The fabric may be stretchable in one direction in which case the stretch would extend circumferentially about the drum, but in making herringbone positive drive belts, two way stretchable fabric is required. The ends of the fabric wrap are suitably joined, and a lap joint having an overlap preferably between ⅕ and ¼ inch has been found satisfactory. The fabric must have sufficient stretch or elongation to cover an area equal to the entire working surface of the finally formed belt and must be capable of completely covering the upper mold surface 36 and the surfaces surrounding the belt teeth cavities 32, shown at FIG. 6. Preferably, the elongation of the fabric 22 should be 60% to meet these requirements without undue strain or rupture. However, a fabric having a greater amount of elongation may be used if desired. Before applying the fabric 22, it is impregnated with a rubber cement, which remains tacky, and the lap joint is adhesively united by the tackiness of the cement.

Next, the load carrying band 23 is applied to the drum over the fabric 22. In the embodiment shown, the load carrying band is made of a substantially non-stretchable material such as prestretched strand cord or wire which is wound over the fabric by conventional methods, the voids being formed between each winding. Since the belt carcass formed in this method will be used to make a single belt, the windings extend across the entire width of the jacket, which is the desired width of the final belt. The ends of the winding may be secured together by conventional methods, for example as described in the aforementioned Patent No. 2,507,852.

A layer of tooth stock rubber 24 is applied over the convolutions of load carrying band 23. Rubber layer 24 may be applied in the form of a calender sheet, and is of sufficient thickness to provide the rubber body 18 of the belt which is extruded through the spaces in the load carrying band 23—here the spaces between the convolutions. As used herein, the term "extruding the rubber" and its related forms refers to the step of forcing or pushing the rubber out to fill the cavity of an external mold when such is used or to the step of forcing or pushing the rubber in to fill the cavity of an internal mold, when such is used. The layer of top cover rubber 25 may be formed over but integrally with rubber layer 24. Thus when rubber layer 24 is softened and extruded through the load carrying band, layer 25 is positioned as the top cover layer of the belt. In order to permit the passage of the rubber 24 through the load carrying band 23, the convolutions thereof are so wound that they occupy an area between 48% to 72% of the total band area, providing sufficient spaces or voids therebetween.

The layer or rubber 24 may be composed of any suitable rubber, such as vulcanizable rubber, or rubber-like materials, which have the proper flow characteristics which will permit it to be forced between the spaces in the load carrying band, and then be cured into a firm solid having a durometer A reading of 75–80. For example, the rubber layer may be composed of the following rubber compounds:

| Ingredients: | Parts |
| --- | --- |
| Neoprene rubber GRT (solid) | 85.00 |
| Neoprene rubber FB (liquid) | 15.00 |
| Stearic acid | .50 |
| Light magnesium oxide | 7.00 |
| Anti-oxidant | 2.00 |
| Carbon black | 55.00 |
| Zinc oxide | 2.00 |
| Low molecular wgt. polyethylene | 6.00 |
| Mercaptobenzothiazole | .75 |
| Total | 173.25 |

The above compound should have a Mooney plastometer reading with the large rotor of 30–40 at 212° F., after being mixed on a mill in the usual manner. The neoprene rubber FB (liquid), and the low molecular weight polyethylene impart to the compound the necessary flow characteristics, which causes it to become relatively liquid or flowable when heated below the vulcanizing temperature so that it can be forced through the convolutions of the load carrying band. When the vulcanization of the rubber is completed, it has the required hardness for the belt teeth, that is a durometer A reading of from 75–80.

The method of building the carcass may be varied when a belt without a jacket is manufactured. Here, the stretchable fabric layer 22 is deleted and the load carrying band is applied directly to the collapsible drum 26 over plates 29 and spaces 30. However, it has been found desirable to first apply a thin ply of uniformly sheeted tooth stock, approximately .015 to .030 inch thick, to the drum and stitching or otherwise closing any splice in the ply. The load carrying band 23 is wound thereon followed by rubber layers 24 and 25 as described above.

Having assembled the belt carcass 21, it is removed by collapsing the drum 26 by turning the rotatable member 27 and slipping it off the collapsed drum. The rubber layers 24 and 25 being tacky are bonded to each other, the load carrying band 23 and the fabric layer 22.

If the belt is to be formed on an internal mold, the carcass may be placed over the outer surface of the mold cavity. Alternatively, the carcass may be built directly over this outer surface, as shown in the copending application, Serial No. 795,547, filed February 25, 1959, by William A. Skura on Method of Making Positive Drive Belts. However, when the belt is to be formed on an external mold as shown at 34, it is necessary for the order of the layers constituting the carcass to be reversed, so that the fabric layer 22 becomes the outer layer and the layer of top cover rubber 25 becomes the inner layer. This is accomplished by twisting the carcass at its sides, and pushing the outer layer around to become the inner layer in conventional fashion. Little resistance to the twisting motion is encountered because the width of the belt is not large. Alternatively, it has been found that the twisting step may be avoided by assemblying the layers of the carcass in the desired inverse order. That is, the first layer to be applied over the expanded drum is the layer of top cover rubber 25, over which the layer of tooth stock rubber 24 is placed, followed by the load carrying band windings 23 and the fabric layer 22 if desired, or the thin ply of tooth stock rubber referred to above.

The carcass having the fabric layer 22 as the outermost layer is shown in FIG. 5 in the external mold 35 comprising mold ring 34. The mold cavity that will form the belt and bet teeth lies external to the carcass and comprises the grooves 32 (belt tooth cavities) between the teeth 33 of a mold gear or mold ring 34. Ring 34 and teeth 33 may form a mold cavity of any desired shape, and in this embodiment, the ring is of the herringbone type so as to produce a belt having a herringbone type pattern of teeth. The upper surface 36 of mold ring 34, hereinafter referred to as the upper mold surface, has a circumference substantially equal to the circumference of the expanded drum; therefore the carcass may be securely positioned within the mold ring since the circumference of the outermost layer of the carcass, fabric layer 22 is substantially equal to the circumference of the expanded drum and upper mold surface 36. The height 37 of the mold is made substantially equal to the width of the carcass 21, so that the carcass rests snugly against the upper mold surface. The snug fit of the carcass in the mold ring alone will prevent vertical movement of the carcass. If desired, the mold ring may be made of two mating rings as shown in the application, Serial No. 509,485, filed by Herman C. Sauer on May 19, 1955, now Patent No. 2,883,701, or may be made of two sections each of a generally semi-circular form, arranged to pivot outwardly about one of the joining points.

The rubber tooth stock layer 24 is extruded through the load carrying band 23 and into the mold cavity 32 by means of heat and outwardly directed radial pressure applied against the inner surface of the carcass 21. While alternative means are known to be capable of providing such pressure and heat, the use of a substantially cylindrical, flexible and expandable sleeve 38 of heat resistant rubber is prefered. This sleeve, as well as the alternatives are described in the aforementioned Patent No. 2,883,701. This sleeve is composed of any suitable elastomeric material, such as heat resistant rubber, compounded and vulcanized in known manner. The dimensions of sleeve 38 are such that it can fit easily within the inner diameter of the carcass 21. The width of the sleeve is made to equal the width of the carcass 21 and the height 37 of the mold 35.

In addition to the mold ring 34, mold assembly 35 comprises a top end plate 40 and a bottom end plate 41 having extending annular retaining rims 42 and 43. These rims encircle and fit closely against mold ring 34 preventing lateral motion thereof. End plates 40 and 41 have central apertures through which mold spindle 44 is positioned. The head 45 of spindle 44 is adapted to bear down on top plate 40, while a spindle nut 46 on the threaded base 47 of the spindle bears up on bottom plate 41, thereby clamping the end plates and rigidly fixing the position of the mold ring.

In order to provide an effective means for expanding sleeve 38 to provide outward radial pressure on the inner surface of belt carcass 21, and to raise the temperature of the rubber layers 24 and 25 so that the rubber may flow through the load carrying band, the mold assembly 35 is provided with a cup shaped adapter 48 for admitting fluid or gas under pressure. As shown in FIG. 5, the open end 49 of the cup shaped adapter bears down on the top surface 50 of the top plate while the bottom end 51 of the cup shaped adapter has a central aperture through which the mold spindle extends. The head 45 of the spindle presses against the cup shaped adapter clamping it and the end plate 40 together in rigid fashion. Adapter 48 is also provided with an enlarged recess 52 which communicates with spaced bores 53 in end plate 40. A tapered bore 54 extends radially through the peripheral wall of adapter 48 and may be threaded to receive a nozzle 55 which is connected to a fluid connector or hose 56 through conventional couplings. Hose 56 is connected to a source of fluid by fluid intake 57 and valve control means 58. In order to prevent any possible leakage of fluid between the connecting fluid conducting elements 52—55, conventional washers may be employed.

It has been found that steam may be used to adequately expand sleeve 38. Steam can be admitted by connecting valve intake 57 to a suitable steam source and will flow into chamber 59. The steam is substantially sealed within the chamber by sidewalls formed by sleeve 38 and end plates 40 and 41. If desired, steam may be allowed to flow from the chamber through small apertures not shown to develop a predetermined pressure at the outside 60 of the mold ring 34. Conventional steam exhaust means may also be provided.

In the preferred embodiment, when the pressure of the steam within chamber 59 reaches a preferred maximum of 90–150 pounds/square inch, the temperature of the steam will range approximately from 331° F. to 368° F. This will be sufficient to completely form and cure the belts.

As the steam is admitted into chamber 59, the temperature within mold assembly 35 rises and uniform outward radial pressure is applied to the inner wall of expandable sleeve 38. The increase in temperature and the applied radial pressure softens the layer of tooth stock rubber 24 and extrudes or squeezes the said rubber through the load carrying band 23 to fill grooves or belt tooth cavities 32. When a herringbone belt is made with a jacket, the fabric 22 is stretchable in two directions as mentioned above, and the pressure applied to the softened tooth stock rubber layer 24 forces the said rubber through the load carrying band to force the stretchable fabric into contact with grooves 32, the rubber filling the space between said stretched fabric and said band with said rubber.

Since uniform outward radial pressure is necessarily exerted on the load carrying band it is placed under tension. However the band will not move into the grooves 32 for the following reasons: the load carrying band is made of a substantially inextensible material, so that its length will increase negligibly under tension; and the upper mold surface 36 is in immediate contact with the band 23 and acts as a restraining surface to limit the expansion of the band. Since the tooth stock rubber 24 flows through the load carrying band 23 having voids therein the adhesion of these members is increased because of their intimate contact.

When the curing is completed, the belt may be removed from the vulcanizer by opening the top thereof, disconnecting the fluid couplings and removing the mold spindle 44. After the top end plate 40 is removed, the belt may be flexed radially inward at a few desired points and pulled upwards to disassociate the teeth of the belt from the teeth 33 of the mold ring 34. Thus the difficulty of removing a herringbone positive drive belt from its mold is eliminated.

Other variations may be suggested in applying the aforementioned teachings. The shape of the teeth on a positive drive belt may be changed by varying the shape of the cavity that forms the teeth. Positive drive belts may be made with guide beads or projections to cooperate with coresponding pulley recesses to prevent lateral motion of the belt by simply providing a mold with a bead head forming cavity. Such positive drive belts may be made with fabric jackets by using the stretchable fabrics disclosed above.

Other means may be used to produce uniform outward pressure for example, an expandable metal band of spring steel could perform adequately. Likewise, variations other than those mentioned may be made by those skilled in the art without departing from the scope of the invention as defined in the appended claims.

Having thus described our invention, what we claim and desire to protect by Letters Patent is:

1. The method of making positive drive belts having an endless load carrying band having voids therein and resilient teeth bonded thereto, comprising the steps of arranging the band and a layer of rubber against the peripheral surface of a mold having tooth cavities therein, said tooth cavities being empty, said band being interposed between said rubber layer and said surface, heating said rubber to soften it, applying pressure to said rubber to force a portion of said rubber in a relatively liquid state through said voids in said band and into said mold tooth cavities to fill said tooth cavities and to mold said belt teeth and bond them to said band.

2. The method of making positive drive belts having an endless load carrying band member containing voids therein and resilient teeth bonded thereto, comprising the steps of forming a belt carcass having an endless layer of said load carrying band member and an endless layer of rubber positioned at one surface of said band in overlying relationship, arranging the belt carcass against the peripheral surface of a mold having tooth cavities therein, said tooth cavities being empty, said band being interposed between said rubber layer and said surface, heating said rubber to soften it, and applying pressure to said rubber to force a portion of said rubber in a relatively liquid state through the voids of said band and into said mold tooth cavities to fill said tooth cavities and to mold said belt teeth and bond them to said band.

3. The method of claim 2, wherein said belt carcass is formed by helically winding a strand in a plurality of convolutions about a collapsible drum and applying a layer of rubber over the wound strand.

4. The method of making positive drive belts having an endless load carrying band member having voids therein and resilient teeth bonded thereto, comprising the steps of forming a belt carcass having an endless layer of said load carrying band member joined to and surrounding in overlying relationship, a layer of tooth forming rubber, inverting said belt carcass whereby said layer of tooth forming rubber surrounds in overlying relationship the said load carrying band layer, arranging the belt carcass against the peripheral surface of a mold having tooth cavities therein, said tooth cavities being empty, said band being interposed between said rubber layer and said surface, heating said rubber, and applying pressure to said rubber to force a portion of said rubber in a relatively liquid state through said voids of said band and into said mold tooth cavities and mold said belt teeth and bond them to said band.

5. The method of making positive drive belts having an endless load carrying band member having voids therein and resilient teeth bonded thereto, comprising the steps of applying an endless layer of said load carrying member over an expanded collapsible drum, applying an endless layer of rubber over said load carrying band layer, joining said load carrying band layer with said rubber layer, inverting said layers including the steps of collapsing said drum, removing said joined layers from the collapsed drum and reversing the positions of said joined layers by applying a twisting force thereto, arranging said joined layers against the peripheral surface of an external mold having tooth cavities therein, said tooth cavities being empty, the outer surface of said band layer having substantially the same diameter as said peripheral surface and being positioned thereagainst, said band being interposed between said rubber layer and said surface, heating said rubber, applying pressure to said rubber to force a portion of said rubber through the voids of said band and into said mold tooth cavities to fill said tooth cavities and to mold said belt teeth and bond them to said band by applying radially outward pressure against said rubber in a relatively liquid state.

6. The method of molding positive drive belts comprising the steps of applying a load carrying band to the circumference of a mold having extending grooves forming tooth cavities therein, said tooth cavities being empty, applying a layer of moldable rubber to said band, applying heat and pressure to said rubber to soften and force said rubber through said band and into said tooth cavities to fill them and form the teeth of the belt in contact with said band, and curing said rubber, thereby bonding it to said band.

7. The method of making a herringbone-positive drive belt having an endless load carrying band member having voids therein and resilient teeth bonded thereto, comprising the steps of forming a belt carcass having an endless layer of two-way stretchable fabric, an endless layer of said load carrying band member overlying said fabric, and an endless layer of tooth forming rubber overlying said band, arranging said belt carcass against the peripheral surface of a herringbone external mold having tooth cavities formed by walls having a herringbone pattern, said fabric being positioned adjacent said peripheral surface, and said band being interposed between said fabric and said rubber layer, heating said rubber to soften it, and applying pressure to said rubber to force a portion of said rubber in a relatively liquid state through the voids of said band, forcing said fabric into contact with the walls of the cavities and filling the space between said fabric and said load carrying band with said rubber to form teeth on said belt.

References Cited in the file of this patent

UNITED STATES PATENTS

| | | |
|---|---|---|
| 1,969,067 | Freeman | Aug. 7, 1934 |
| 2,507,852 | Case | May 16, 1950 |
| 2,593,547 | Duerksen | Apr. 22, 1952 |
| 2,620,016 | Adams | Dec. 2, 1952 |
| 2,628,505 | Riel et al. | Feb. 17, 1953 |
| 2,761,489 | Kraft | Sept. 4, 1956 |
| 2,792,872 | Murray | May 21, 1957 |
| 2,831,359 | Carle | Apr. 22, 1958 |
| 2,865,214 | Runton | Dec. 23, 1958 |
| 2,883,701 | Sauer | Apr. 28, 1959 |
| 2,983,637 | Schmidt | May 9, 1961 |

FOREIGN PATENTS

| | | |
|---|---|---|
| 744,907 | Great Britain | Feb. 15, 1956 |

UNITED STATES PATENT OFFICE
CERTIFICATE OF CORRECTION

Patent No. 3,078,205

February 19, 1963

Herman C. Sauer et al.

It is hereby certified that error appears in the above numbered patent requiring correction and that the said Letters Patent should read as corrected below.

Column 7, line 37, after "cavities" insert -- to fill said tooth cavities --; column 8, line 2, after "rubber," insert -- and --.

Signed and sealed this 10th day of September 1963.

(SEAL)
Attest:

ERNEST W. SWIDER
Attesting Officer

DAVID L. LADD
Commissioner of Patents